United States Patent [19]
Steffel

[11] 3,883,744
[45] May 13, 1975

[54] MACHINES FOR EXAMINING PNEUMATIC TIRES

[76] Inventor: Horst Steffel, Fischerweg 2, 24 Lubeck-Gothmund, Germany

[22] Filed: Nov. 13, 1972

[21] Appl. No.: 305,910

[30] Foreign Application Priority Data
Nov. 23, 1971 Germany............................ 2157964

[52] U.S. Cl............................... 250/360; 250/453
[51] Int. Cl. ............................................ G03b 41/16
[58] Field of Search ...... 73/146; 250/312, 321, 359, 250/360, 450, 453

[56] References Cited
UNITED STATES PATENTS

| | | | |
|---|---|---|---|
| 3,550,443 | 12/1970 | Sherkin................................. | 73/146 |
| 3,621,246 | 11/1971 | Horsey et al......................... | 250/360 |
| 3,621,247 | 11/1971 | Lide..................................... | 250/360 |
| 3,656,343 | 4/1972 | Braden et al. ....................... | 73/146 |
| 3,801,786 | 4/1974 | Neuhaus............................... | 250/453 |

Primary Examiner—James W. Lawrence
Assistant Examiner—C. E. Church

[57] ABSTRACT

In a preferred embodiment, an x-ray tire-tread inspecting machine including opposing-spaced-apart plates each having a flat face in a plane parallel to the plane of the other and each rotatable around its respective axis with their respective axes of rotation being about parallel to one-another, with converging drives for varying the space between the opposing plates with a non-rotatable X-ray transmitting device mounted centrally-of one of the plates for irradiating X-rays laterally between the plates through a tread of a tire having its sidewalls vise-mounted between the plates, with an air-injection passage being defined centrally through one of the plates for inflation and deflation of the tire sealed between the opposing plates, and an aligned radiation-receiving screen being lever-mounted on a spring biased lever positioned to biasedly press against a tire tread such that closeness of the screen to the X-ray transmitting device is variable in direct proportion to tire diameter, and a light-sensing switch device being positioned to stop movement of the plates toward one-another when the mounted tire relative to a light beam obstructs the light beam from the light-sensing device.

3 Claims, 7 Drawing Figures

MACHINES FOR EXAMINING PNEUMATIC TIRES

The present invention relates to machines for examining a pneumatic vehicle tire which is clamped in position and rotatably drivable at its outer periphery, said machine having an X-ray tube arranged to pass X-radiation through the tire from inside and a projection screen being provided externally of the machine together with a television camera connected to a monitor, the unit formed by the projection screen and television camera being adjustable in relation to the point of focus of the X-ray tube and a control console being provided for remote operation of the machine.

For examining pneumatic vehicle tires by means of X-ray radiation it is known to support the tire, which stands upright, on two, mutually parallel, horizontal rollers and to maintain it in the upright position by holding-members resting against the inner side of the side-walls of the tire, while it is rotatively displaced by at least one of the support rollers. In the space within the inner circumference of the tire is the X-ray tube for irradiating the tire from inside, which is mounted on a pivotable arm. A unit which is mounted on a platform and consists of projection screen and television camera arranged for co-operation therewith is aligned horizontally with the focal point of the X-ray tube so that the X-ray image of the area of the tire tread being irradiated is projected on to the projection screen, from which it is transmitted, via the camera, to a monitor set up at a distance in order to discover possible faults, e.g. in the steel belt embedded in the tire. In addition to the monitor, a control console is provided from which a series of operations by this known X-ray examination apparatus can be remotely controlled. The unit mentioned is mounted to be displaceable in the horizontal direction so that, for smaller tires, it can be brought closer to the tire so that the screen may be used to better advantage and so that the possibility of evaluating the irradiated portion of the tire optically is improved, this displacement, however, being performed separately by hand. With this known apparatus it is not possible to examine the tire to be checked fully automatically since the fitting and removal and the introduction of the tire into the checking station each have to be undertaken by a member of the operating staff. This operating process of the apparatus takes a particularly long time if the tires to be checked are of different diameters and are required to be examined randomly.

It is therefore an object of the invention to establish a machine for examining the tread make-up of pneumatic vehicle tires by X-rays, with which it is possible automatically to examine tires of different diameters supplied randomly to the machine. Other objects and advantages will become apparent from a perusal of the Specification which is to follow. In fulfilling these objects, the machine includes two retainer plates capable of being brought into contact with the side-walls of the tire, which is centred with respect to them, in a controlled fashion in said machine, at least one of which plates surrounds the X-ray tube in the form of an annular plate and the two being rotatably mounted facing one another in two cross-members which can be moved in opposite directions, under control, the plate opposite the annular plate being separately movable towards and away from the latter, both cross-members being so movable in conjunction that the central plane between the plates holding the inflated tire coincides with an imaginary straight line extending through the focal point of the X-ray tube and the centre of the projection screen and the tire being rotatably displaceable together with the plates.

In an advantageous embodiment of the invention the two cross-members, which are arranged one above another, are mounted, adjacent their ends, on common vertical guide-pillars which are rigidly connected by an upper and a lower cross-strut, thus inter-connected cross-members being capable of being raised and lowered by a pneumatic cylinder drive-unit operating on both ends of the lower cross-member and preferably on the upper cross-strut. The X-ray tube may be rigidly secured to the upper cross-strut and a bore may be provided in the upper cross-member to align with the centre of the annular retainer plate which is fixedly mounted on this cross-member, to form an entry passage for the X-ray tube. Another feature is that the retainer plates may each have two circular, mutually concentric, ridge-like projections in their lateral areas adjacent the side-walls of the tire. A further feature is that the two cross-members may be connected by two actuating spindles which are displaceable in rotation and which each have a right and a left-hand tread, one spindle being arranged in the vicinity of each of the ends of the cross-members a light-barrier being provided, which is in a fixed relationship to the upper retainer plate and halts the mutually opposed movement of the cross-members.

With this apparatus it is possible to examine the tread make-up of pneumatic vehicle tires fully automatically by means of X-ray beams without disruption, it being possible to feed randomly, tires which have different outside diameters to the checking machine. The examination may be related, for example, to whether the steel belt incorporated in the make-up of the tread is accurately embedded in the tire or whether such belt is defective in some other way, and so on. The tire which has been fed to the machine and is resting centrally on a platform associated with the mahcine, is gripped from outside and on both sides on the side-walls of the tire by the two retainer plates which are to be moved towards one another. A light-barrier which is in a fixed relationship to the upper retainer plate ensures the cessation of the clamping motion of the retainer plates at the instant when the light beam is interrupted by the tire which is resting on the lower retainer plate and is moving upwards, so that the tire is only held fast between the retainer plates by use of compressed air. This has the result that, on the one hand, the final separation between the retainer plates which hold the tire clamped is fixed automatically and, on the other hand, that all tires which can be externally gripped on their side-walls by the retainer plates can be clamped in position independently of the sequence in which they are examined. Since the side-walls of the tires extend radially over a relatively large area it is possible, with a suitably selected size of retainer plate, to clamp all tires of current sizes with a single pair of retainer plates.

In order that the invention may be more clearly understood, reference will now be made to the accompanying drawings which show one embodiment thereof by way of example and in which.

Figure 1:
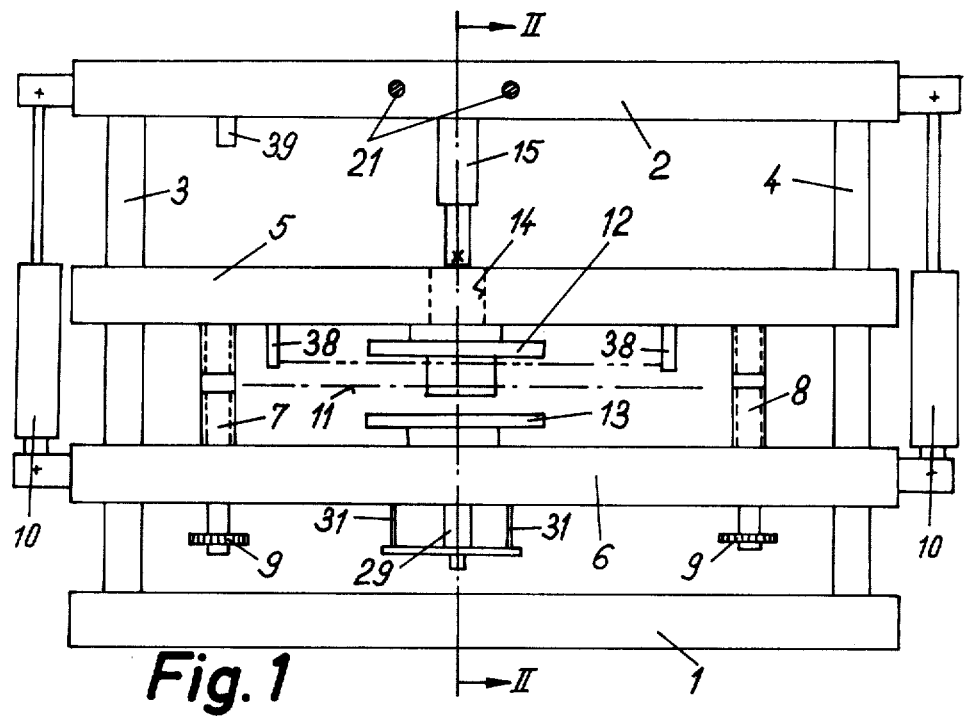
FIG. 1 shows a side view of the schematic make-up of a machine according to the invention.

Referring to the drawings, according to FIG. 1 the machine according to the invention for examining pneumatic vehicle tires by X-radiation consists of stationery upper and lower horizontal cross-struts 1 and 2, which are rigidly connected by one or more lateral, vertical guide-pillars 3, 4. Two cross-members 5 and 6 arranged one above another are displaceably mounted on the guide-pillars and are connected by two lateral treaded actuating spindles 7 and 8 and are held at the required distance from one another by these spindles. Actuation of these spindles is effected via a sprocket-wheel 9, for example, both wheels 9 being set in rotation via a common chain and a motor (neither of which are shown since their disposition and operation will be readily apparent to those skilled in the art to which the invention relates). The two actuating spindles 7, 8 each have a section with a right-hand tread and a section with a left-hand tread so that the cross-members 5, 6 are able to be moved in opposite directions, the position of the central plane 11, which extends horizontally between the cross-members, remaining unaltered when the cross-members move in opposite directions and being usable as a reference plane. Preferably a pneumatic cylinder 10 operates on each of the two sides of the lower cross-member 6, and both cylinders are fastened to the upper cross-strut 2 at the other end so that both cross-member 5, 6 are movable vertically in conjunction with the cylinders 10, by which means the position of the central plane 11 is also altered.

Figure 2:
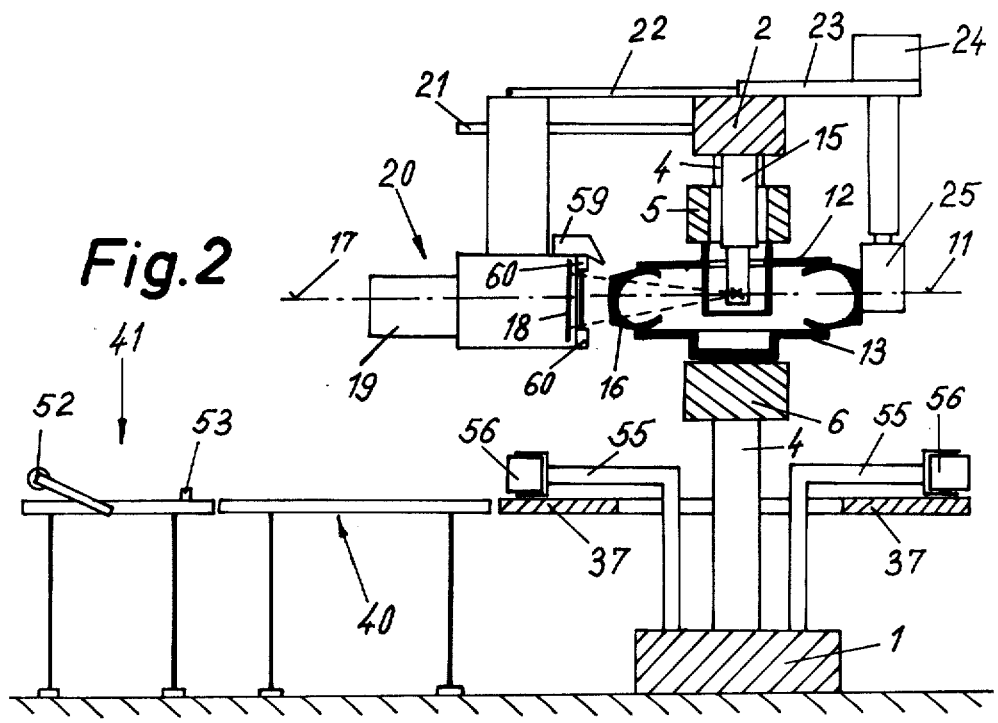
FIG. 2 shows a sectional view of the machine along line II—II of FIG. 1.
Figure 3:
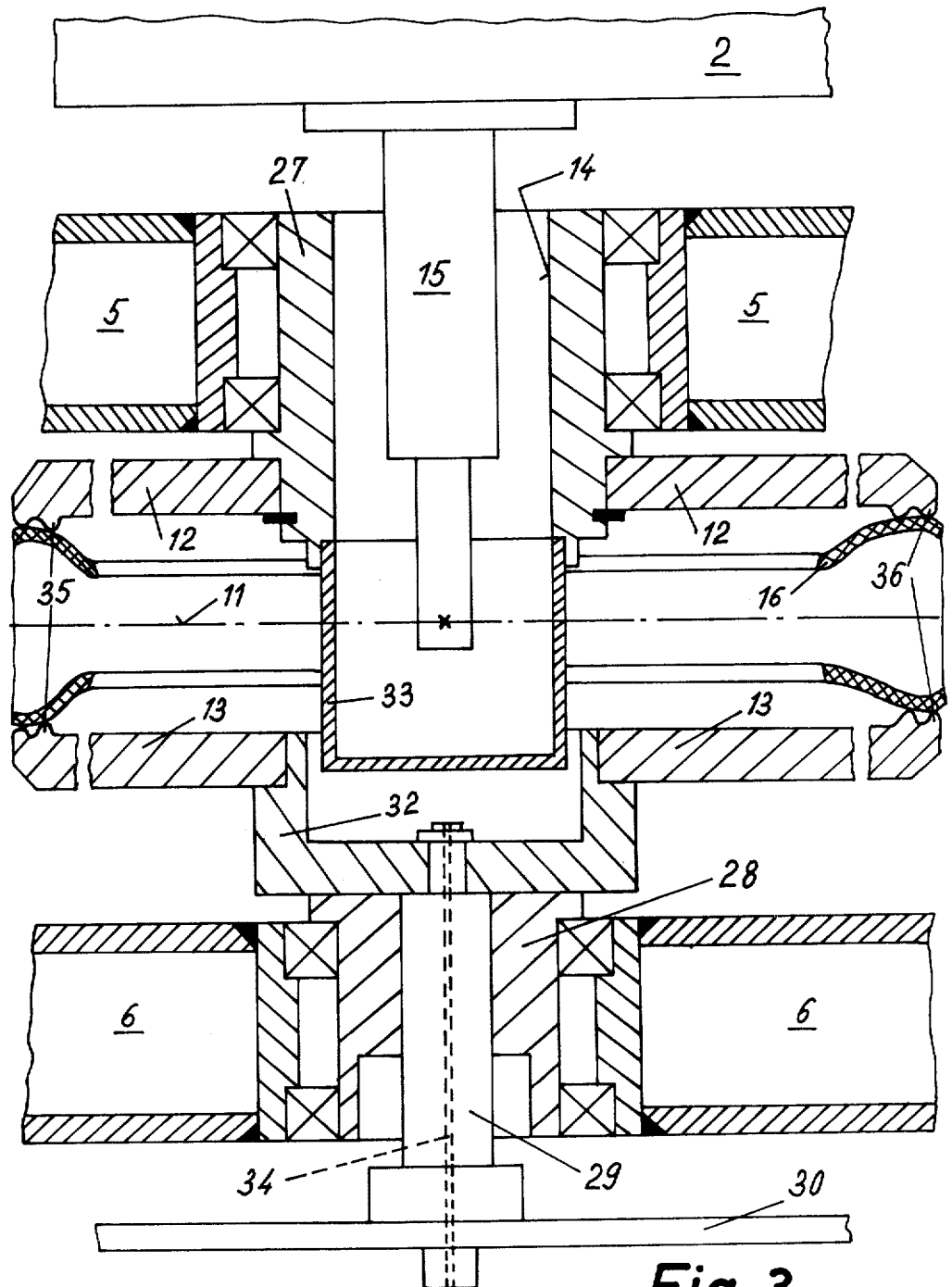
FIG. 3 shows the mounting of the retainer plates in the cross-members in a schematic sectional view.

Two oppositely disposed retainer plates 12, 13 in mutual alignment are rotatably mounted in the cross-members 5, 6 preferably centrally to the machine, as can be clearly seen from FIG. 3. The upper retainer plate 12 is formed as an annular plate and its central opening is in alignment with a bore 14 in the upper cross-member 5 so that, when the platforms 5 and 6 are moved upwards, an X-ray tube 15, which is fixed to the uper cross-strut 2, passes through the bore 14 and the central opening of the retainer plate 12 to take up the position shown in FIGS. 2 and 3.

Figure 4:
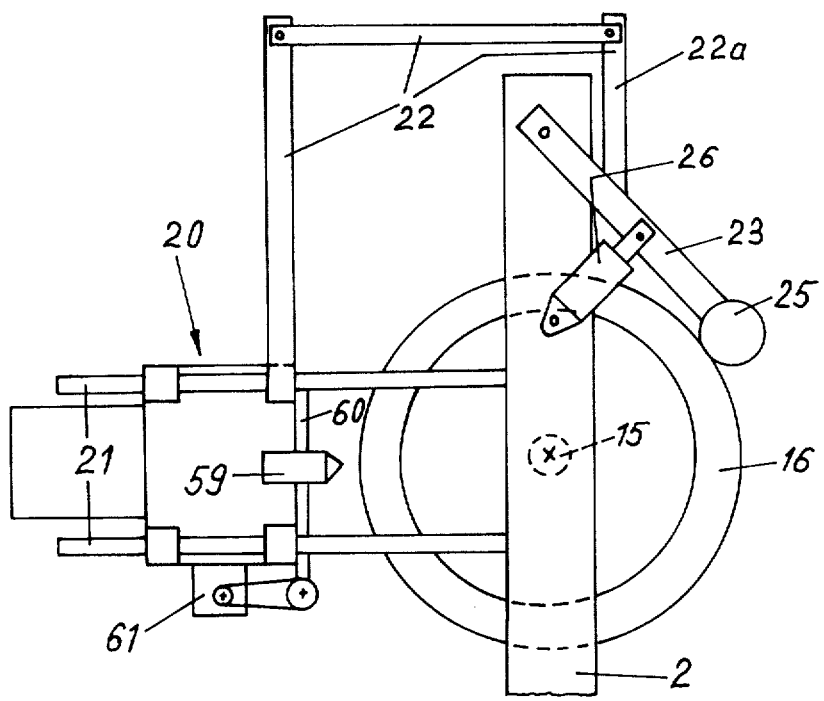
FIG. 4 shows a simplified plan-view of the machine according to the invention.

FIG. 2 shows a tire 16 clamped in position flat between the retainer plates 12 and 13, which has been raised into the checking position, the checking position being that position in which the centre plane 11 extends through the focal point of the X-ray tube 15, which is shown by a cross, and coincides with the horizontal central axis 17 of the unit 20 formed by a projection screen 18 and a television camera 19 arranged facing it. The unit 20 is mounted on two guide rods 21 fixed to the upper cross-strut 2 to move along the central axis 17 passing through the focal point of the X-ray tube. The movement is effected by means of a lever-arm 22 which is secured by its other end to a pivoting arm for rotating the tire. Since a part 22a of the lever arm is rigidly connected to the pivoting arm 23, the unit 20 will always automatically assume a constant distance from the particular tire fitted when the tire drive-roller 25, which is driven by a motor 24, comes into contact with the tire 16 as a result of the arm 23 being pivoted by means of a pneumatic cylinder 26 (FIG.4).

FIG. 3, which shows the tire 16 clamped in the examination position, shows schemtically and in particular the construction and the mounting of the retainer plates 12 and 13 and the position of the X-ray tube 15 in the examination position. The X-ray tube 15 projects through the bore 15 and the central opening of the upper retainer plate 12, the bore being formed by a bush 27 rotatably mounted in the upper cross-member, this bush also carrying the upper retainer plate 12. It çan be seen that the plate 12 is thus only rotatable with respect to the cross-member 5; in other respects it is fixedly mounted. On the other hand, the lower retainer plate 13 is rotatably mounted in the lower cross-member 6 via a bush 28, on which it is freely supported, and is mounted so as to be raisable and lowerable with respect to this cross-member by means of a plunger 29, a cross-bar 30 and piston rods 31 of a pneumatic cylinder (not shown) provided in the platform 5. Such pneumatic cylinder may take any of the forms well known in the art. The plate 13 has a cup-shaped central area 32, which is recessed with respect to the upper plate 12, into the unobstructed space in which a protective tube 33 partly penetrates when required, as will hereinafter be explained. The tube 33, which is preferably made from a plastics material, is secured in an air-tight fashion to the upper bush 27 and protects the X-ray tube 15 against the compressed air fed in through an inlet passage 34 in the plunger 29 to the space enclosed by the plates 12, 13 and the tire 16, for the purpose of clamping the tire in position. In the area of their periphery the exchangeable retainer plates each have two circular, mutually concentric ridge-like projections 35, 36 which apply themselves to the side-walls of the tire, the inner projection 35 projecting further than the outer projection 36 for more reliable and tighter application to the side-walls of the tire.

Conveyance into and clamping of the tire in the examining position takes place as follows. The tire, which is fed forward individually and is centred on a platform 37 forming part of the machine, is first gripped from below on the lower side-wall by the lower one of the retainer plates, which have been moved apart and lowered in conjuction, and is then raised, which is effected by moving the platforms 5, 6 together by means of the spindles 7, 8 which are rotated for this purpose. Since a standard light-barrier 38, which halts the movement of the platform towards one another, is associated with the upper fixed retainer plate 12 in a fixed relationship such that the light beam passes just under the plate, the approach is halted when the light-beam is interrupted by the tire. the relative position of the plates 12, 13 at the time is also the subsequent examining position of the plates. First, however, the lower plate 13 is raised by a desired amount towards the fixed upper plate 12 by the plunger 29, by which means the tire 16 is slightly compressed. The side-walls of the tire are thus applied sufficiently tightly and firmly to the plates so that compressed air may now be introduced via the entry passage 34. The force of the pressurised air for inflating the tire so arising which acts on the lower plate 13, has the effect of pressing the lower plate back down towards the bush 28 since the pneumatic lifting force of the plunger 29 is lower at any time than the force of the air for inflating the tire. At this point, or even before, the two cross-members are transported upwards in conjunction by the cylinder 10 to the examining position referred to above, this position being determined by a solid stop 39, against which the upper cross-member, for example, abuts.

In addition, the drive roller 25 comes into contact with the tire and, at the same time, the unit 20 comes to the checking distance at which X-ray examination can be performed. It should be mentioned that the sidewalls of the tire are spread apart, when the tire tread is irradiated, to such an extent that the conventional wire inserts in the tire beads are situated outside the radiation area of the X-ray tube.

Figure 5:
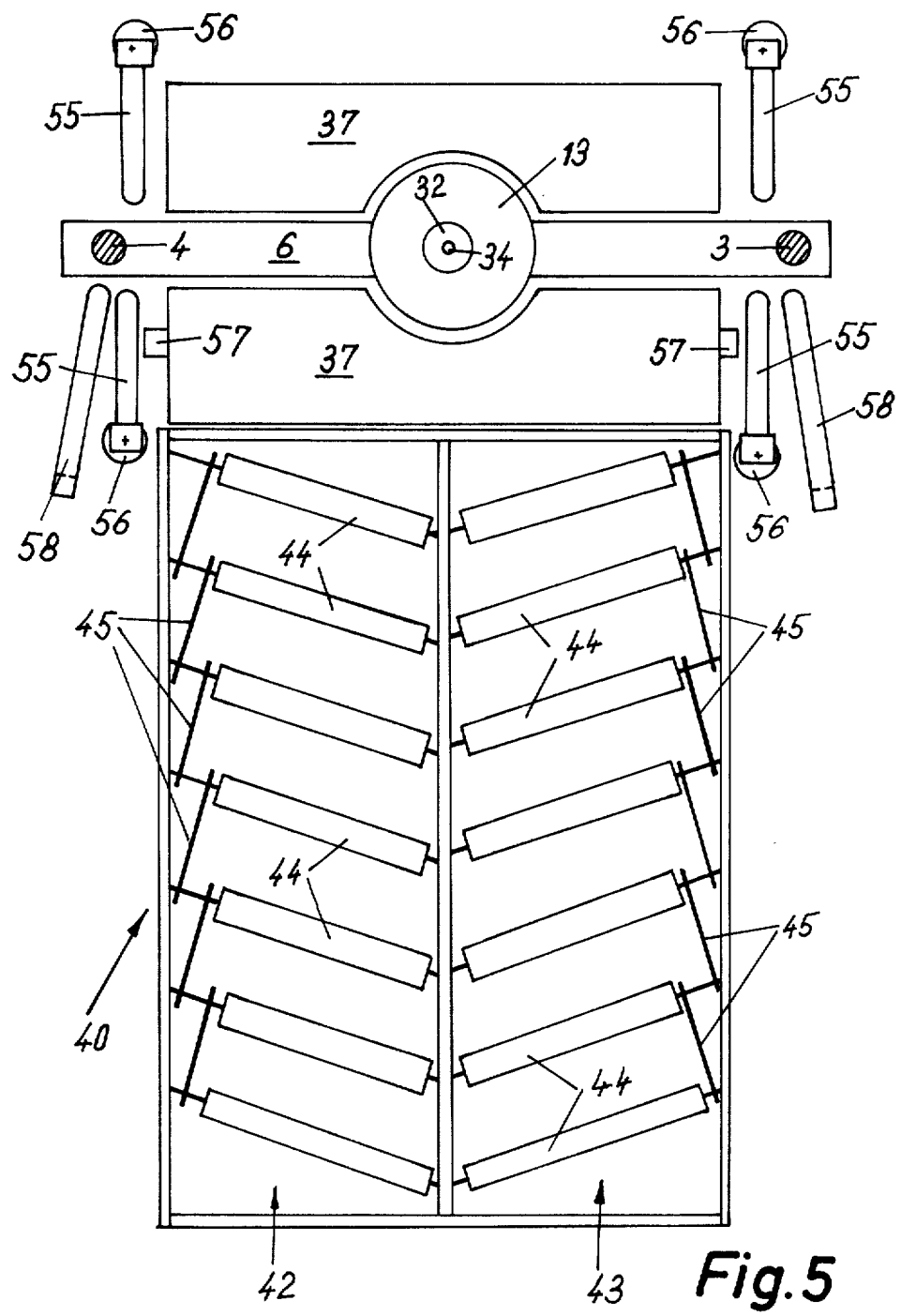
FIG. 5 shows another plan-view of the machine according to the invention.
Figure 6:
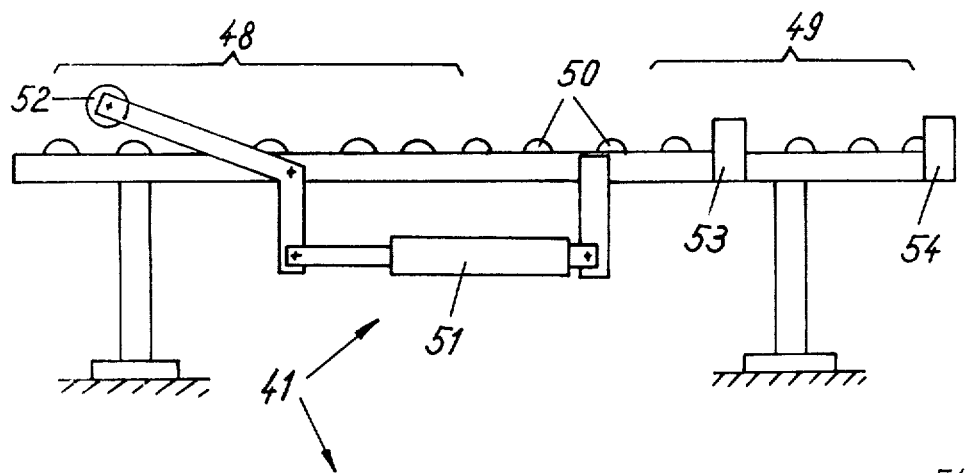
FIG. 6 shows a side view of an apparatus for single-feeding tires.

For controlled supply of tires to be examined, the machine platform 37, which consists of a plurality of freely rotatable rollers and has a passage for the lower cross-member 6 and the plate 13, is associated with a conveyor 40 with a downstream apparatus 41 for tires one at a time. As shown in FIG. 5, the conveyor comprises two mutually parallel, drivable sets of rollers 42, 43, the individual rollers 44 being connected by chain drives 45 and being arranged in a V-shape such that the outer ends of the rollers project further forward in the direction of feed than their inner ends.

Figure 7:
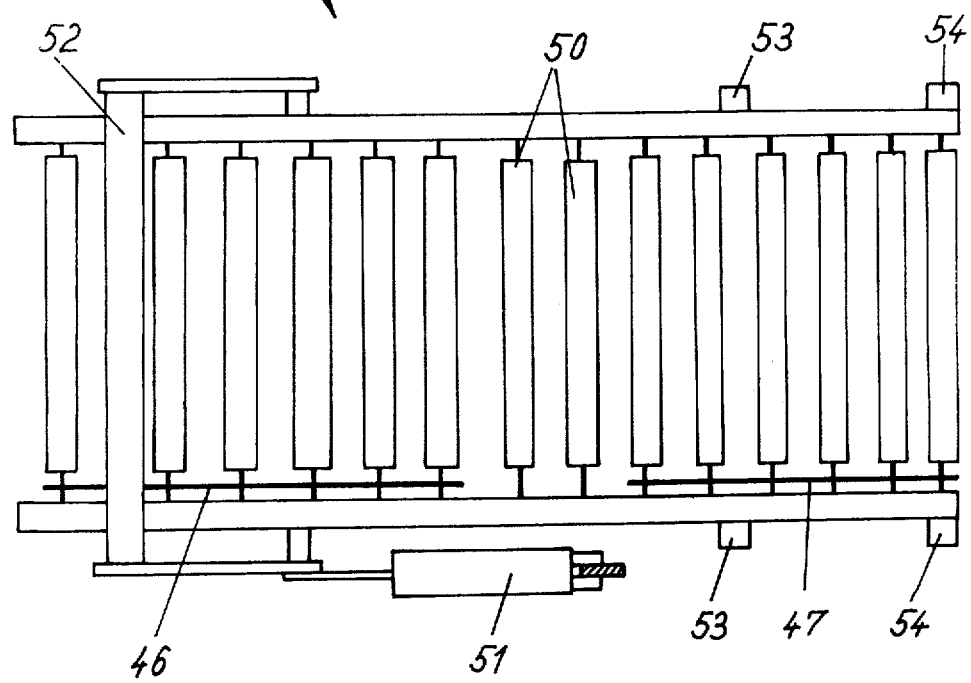
FIG. 7 shows a plan view of the apparatus in FIG. 6.

The tire-feeding apparatus 41 comprises two section of rollers driven by means of two chain drives 46, 47 (FIG. 7) between which is mounted at least one undriven roller 50, and a barrier 52 operable by means of at least one pneumatic cylinder 51 which is controlled by a photocell arrangement 53 arranged upstream of the barrier. When the passage through the barrier is unobstructed one or more tires, depending on the size, reach the feed-track of the apparatus 41, and when the light beam associated with the device 53 is interrupted, the barrier closes, one tire reaching the separately driven section 48. To achieve the latter in every case, the rollers in section 49 run faster than those in section 48, for which the undriven rollers 50 contribute some assistance.

To feed the tire lying on section 49 to the machine-platform 37, the rollers in this section are driven, under the control of an additional photocell arrangement 54, which is coupled to the tire-checking machine, and the tire is fed on, via the conveyor 40, which pre-centres the tire towards the centre of the conveyor as a reult of the V-shaped arrangement of its rollers, to the platform 377, which is associated with an apparatus for centring the tire. This latter apparatus consists fo four centring arms 55 which are pneumatically pivotable in the horizontal plane and which have freely rotating rollers 56 at their outer ends, to grip the outer periphery of the tire, so that the tire, as a result of the inward pivoting of the centring arms, is centred concentrically with the clamping plates 12, 13 as it lies on the platform 37 (FIGS. 2 and 5). Advantageously, the centring movement of the centring arms is initiated by a further light-barrier 57.

An apparatus consisting of two mutually facing arms 58, which are pivoted horizontally by pneumatic means, is provided to eject the tire which has been examined and deposited back on the machine platform 37 (FIG. 5). The arms 58 also pivot to the centre of the machine and thus remove the tire from the platform 37.

Advantageously, a color-marking apparatus 59 which is remotely operable from a control console, located at a distance from the machine and having a monitor, is attached to the unit 20, by which a colored mark can be made on the tire when a defect in the tread is discovered. Of course, any other distinguishing mark may be arranged to be made. In addition, an arrangement consisting of two cross-strips 60 which are adjustable in opposite directions is arranged in front of the projection screen 18 forming part of the unit 20, by which the degree of off-centre displacement of the steel-belt insert can be determined by suitable setting of the cross strips in relation to one another. The horizontal cross-strips 60 are, for example, mounted on two lateral, vertical guide posts, one of which is provided with a right-hand and a left-hand tread and is able to be driven by a motor 61.

It should also be mentioned that a hydraulic drive for the appropriate parts of the machine can be used instead of the pneumatic drive. Compressed air is, however, always used for clamping the tire between the retainer plates.

We claim:

1. A tire-examining device comprising in combination: first disk means having a first circumscribing flat lower face extending in a first plane, and for rotation of said first face along said first plane around a first central axis structure extending transversely of the first disk means; a first shaft means rotatably mounting said first disk means for said first rotation; second disk means having a second circumscribing flat upper face extending in a second plane substantially parallel to the first plane with second central axis structure extending transversely to the second disk means and substantially coaxially with said first axis strcture; the flat lower face and the flat upper face each being of predetermined diameter greater than diameters of annular beads of a tire to be mounted therebetween such that in opposing relationship the flat lower face and the flat upper face are gripable in vise manner against opposite side faces of a tire mounted for inspection; plate moving axially one of the first disk means and the second disk means relative to the other to and fro upwardly and downwardly along first and second central axis structure such that distance between the first face and the second face is variable; X-ray means axially extending transversely substantially centrally through one of the first and second disk means, for directing radiation laterally between the first and second flat faces, the X-ray means being mounted such that it is independent of rotation of the first and second disk means; gas-injection means having passage structure defining a passage extending about centrally through at least one of said first and second disk means, for gas injection into and exhaustion of gas from inner-tire space of a tire vise-mounted with opposite side-walls thereof sealably between the first and second disk means; projection screen means having a projection surface mounted to extend substantially transversely to and aligned with the space between said first and second planes and in alignment with and substantially perpendicular to said laterally directed radiation from said X-ray means; the projection screen means including said projection surface, spring lever elements, and screen-mounting elements operatively interconnected for moving the screen surface substantially perpendicularly to and fro alternately toward and away from the X-ray means; and a part of the lever elements being spring-biased by the spring lever elements to be positioned against and for movement by an outer tire tread of a tire being mounted between the first and second flat faces such that the screen projection surface becomes positioned distantly from the X-ray means when a tire of larger diameter is mounted and becomes positioned closer when a tire of small diameter is mounted between the first and second disks, said plate moving means including a light-receiving element and switch circuitry connected thereto such that blocking of light to the light-receiving element causes movement of one or more of the first and second disk means toward one-another to terminate automatically, the light-receiving element being positioned to receive a light beam between the first and second disk means and for a tire mounted therebetween to block a beam of light to the light-receiving means when the tire's opposite side walls become both engaged between the first and second disk means.

2. A tire-examining device of claim 1, including encapsulating structure enclosing the X-ray means from exposure to gas from gas injected by the gas-injection means.

3. A tire-examining device of claim 2, including bilateral conveyor means for serially conveying tires each on its side and including mounted bilateral conveyor sets of rollers and drive means therefor, one serially arranged set of driven sets of rollers being angularly positioned relative to a bilateral second set of bilateral driven set of the rollers, such that a tire positioned on and about equally between the two sets of roller is maintained about equally central of mid-position between the opposing bilateral sets by each set directing the tire toward the other, and the conveyor means being aligned to deposit a tire thereon onto the lower disk mean's flat face.

* * * * *